Sept. 18, 1951  J. SCUDERI  2,568,370
QUICK CHANGE SELF-LOCKING WHEEL MOUNTING
Filed Sept. 2, 1950  3 Sheets-Sheet 2
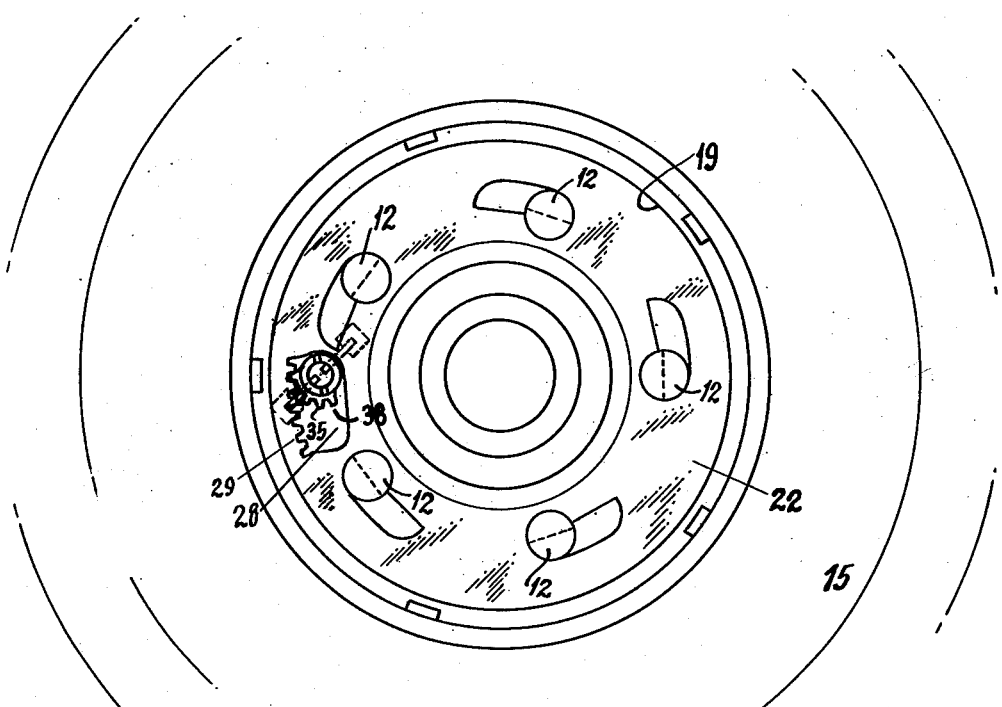
FIG.4
FIG.9
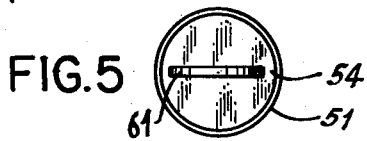
FIG.5
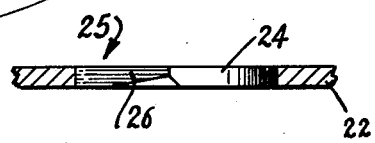
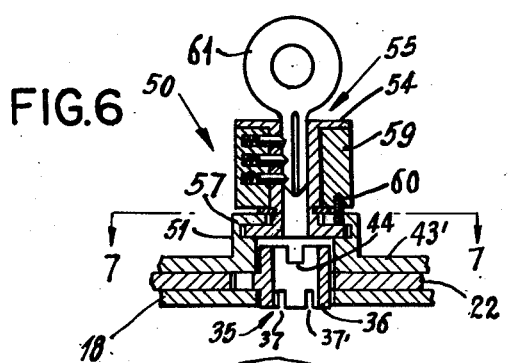
FIG.6
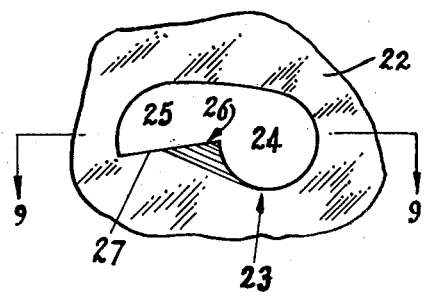
FIG.8
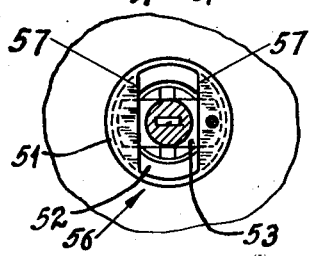
FIG.7
JOHN SCUDERI
INVENTOR
BY *Joseph Blacker*
ATTORNEY Sept. 18, 1951 J. SCUDERI 2,568,370
QUICK CHANGE SELF-LOCKING WHEEL MOUNTING
Filed Sept. 2, 1950 3 Sheets-Sheet 3

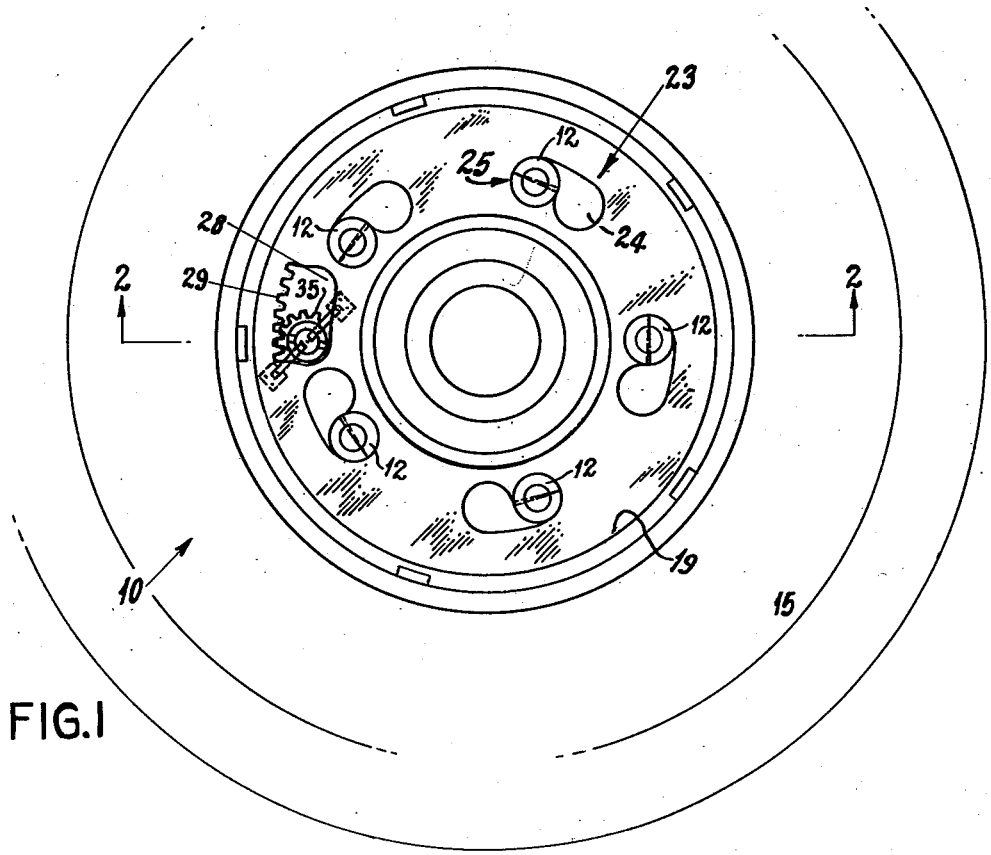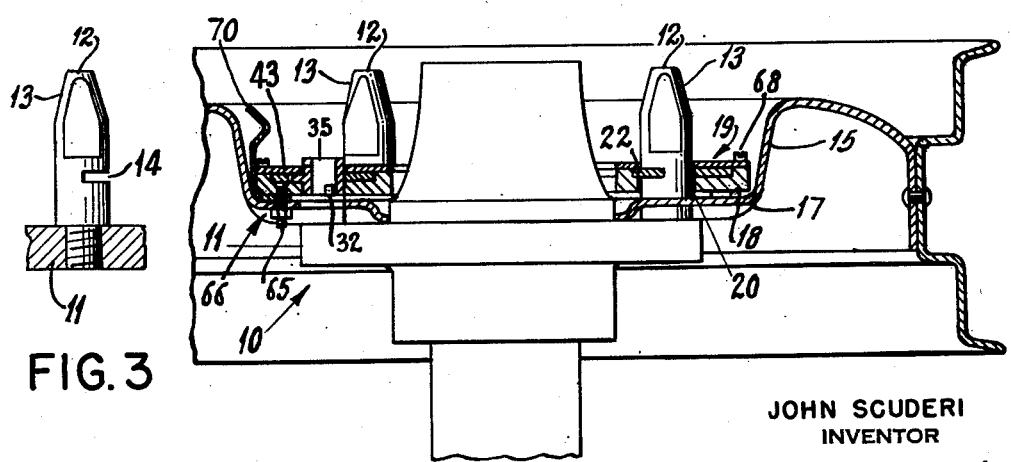

JOHN SCUDERI
INVENTOR
BY Joseph Blacker
ATTORNEY

Patented Sept. 18, 1951

2,568,370

UNITED STATES PATENT OFFICE 2,568,370

QUICK-CHANGE SELF-LOCKING WHEEL MOUNTING

John Scuderi, Brooklyn, N. Y., assignor of one-half to Charles P. Orlando, Ozone Park, N. Y.

Application September 2, 1950, Serial No. 183,010

6 Claims. (Cl. 301—9)

1

This invention relates to vehicle wheels, and more particularly to automobile wheels, and refers to new and useful improvements in wheel assemblies of the quick detachable type.

An object of this invention is to provide a wheel assembly which will permit the removal of the wheel without removing a number of threaded nuts.

Another object of this invention is to provide a wheel assembly which will require the least amount of effort on the part of the operator for quickly dismounting and remounting the wheels.

Another object of this invention is to form a radially directed slotted opening in each stud and to provide a rotatable cam plate having modified keyhole shaped openings, the openings having tapering inner walls designed to engage the slotted portions of the studs in wedged engagement whereby the assembly is adapted to withstand vibration.

Another object of this invention is to provide a key operated gear for rotating the cam plate, and to provide an open ended housing concentric with the gear and a cylinder lock removably mounted in the housing to cover the housing opening, and whereby operation of the cylinder lock key will permit removal of the cylinder lock to expose the opening in the gear for insertion of the operating key into the gear, to permit authorized actuation of the cam plate or to remove the operating key and mount the locking mechanism to prevent unauthorized actuation of the cam plate.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 1 is a plan view of a demountable wheel mounted on an axle and with the locking mechanism in locked position, the retaining plate being removed.

Figure 2 is a cross-sectional view taken on line 2—2 in Figure 1.

Figure 3 is a view of a fragmentary portion of the hub plate and a radially slotted stud threaded therein.

Figure 4 is a plan view similar to that shown in Figure 1, but with the locking mechanism in unlocked position, the retaining plate being removed.

Figure 5 is a top plan view of a fragmentary portion of a modified locking mechanism, showing a tumbler lock for preventing authorized operation of the mechanism.

2

Figure 6 is a central cross-sectional view of the tumbler lock device shown in Figure 5.

Figure 7 is a cross-sectional view taken on line 7—7 in Figure 6.

Figure 8 is a plan view of a fragmentary portion of the cam plate on an enlarged scale showing a modified key-hole shaped opening.

Figure 9 is a cross-sectional view taken on line 9—9 in Figure 8 of a fragmentary portion of the cam plate.

Figure 10:
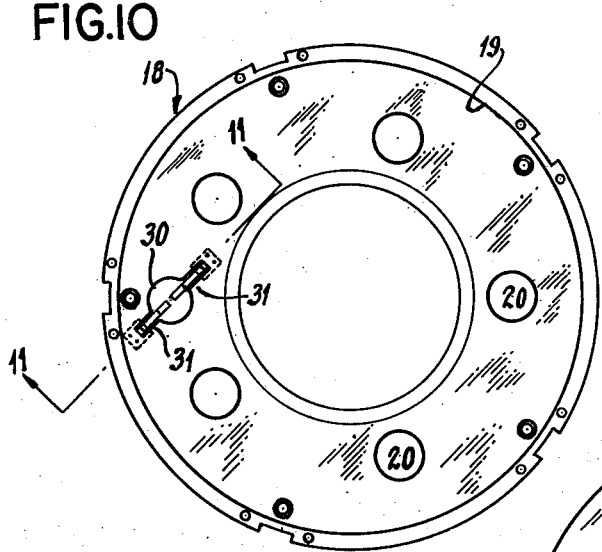

Figure 10 is a top plan view of a recessed disk.

Figure 11:
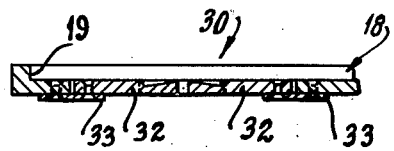

Figure 11 is a a cross-sectional view on an enlarged scale and taken on line 11—11 in Figure 10.

Figure 12:
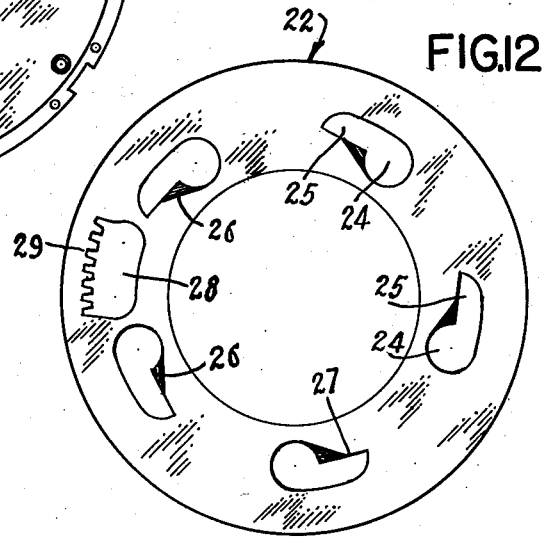

Figure 12 is a top plan view of the cam plate.

Figure 13:
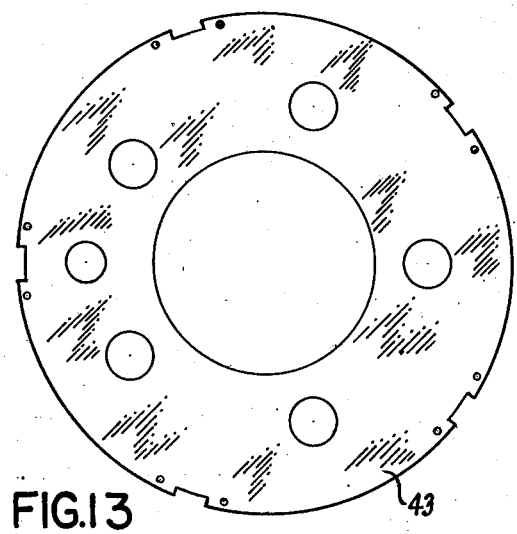

Figure 13 is a top plan view of the retaining plate.

Figure 14:
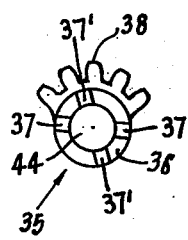

Figure 14 is a plan view of the operating gear, showing the inner hub.

Figure 15:
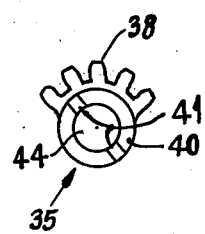

Figure 15 is a plan view of the operating gear, showing the outer hub.

Figure 16:
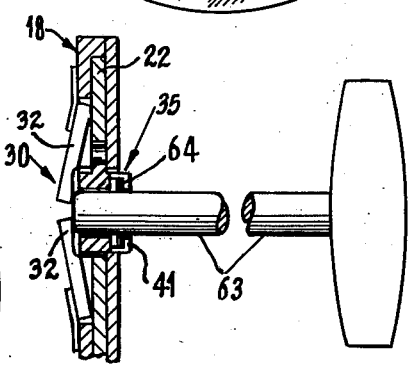

Figure 16 is a detail view of the operating handle.

In the illustrated embodiment of the invention, the numeral 10 indicates a locking assembly for demountable wheels for vehicles. The assembly comprises a hub plate 11 having five studs 12 integral therewith. Each stud 12 has a tapering free end portion 13, and a radially directed slotted opening 14 facing the axis of the wheel 15.

Secured to the dished central portion 17 and centrally of the wheel 15 is a disk 18 having an annular recess 19 and openings 20 to receive the studs 12. The recess 19 forms an annular guideway.

A disk-shaped cam plate 22 is rotatably mounted in the annular guideway 19 and has modified key-hole openings 23 comprising large circular end portions 24 through which the studs 12 may freely pass. Each opening 23 terminates in a linear end opposite the circular end. The linear end portions 25 have tapering inner walls 26 designed to engage the slotted portions 14 of the studs 12 in wedged engagement.

Each opening 23 has an internal locking tooth 27 which passes into the slotted opening 14 in the stud 12. The tapering portion 26 of the tooth 27 provides easy entrance into the opening 14. The straight face of the tooth 27 is made in slightly angular relation with the inner wall of the opening 14 in the stud 12 so as to wedge against the stud to withstand vibration.

The cam plate 22 has an arcuate opening 28 and gear teeth 29 facing inwardly of the opening. The gear teeth 29 are positioned concentrically with the outer periphery of the recessed disk 18.

The recessed disk 18 has a circular opening 30 in alignment with the gear teeth opening 28. The opening 30 has two diametrical continuation openings 31 extending outwardly on opposite sides. Two spring arms 32 are mounted in the openings 31 and have their far ends suitably secured to spring steel extensions 33 which are riveted to the recessed disk 18. The spring arms 32 are movable laterally of the recessed disk at their adjacent free ends.

A segmental gear 35 is employed for rotating the cam plate 22 and has an inner hub 36 with two diametrically positioned slots 37, 37'. The inner hub 36 is engageable in the circular opening 30 in the recessed disk 18. The gear 35 has teeth 38 in meshed engagement with the gear teeth 29 in the cam plate 22.

The gear 35 has an outer hub 40 with a single diametrical slot 41. The outer hub is engageable in a circular opening 42 in a retaining disk 43. An opening 44 extends through both hubs 36 and 40 and serves to receive an operating key.

Figures 5, 6 and 7 show a modified locking mechanism 50 comprising a tubular housing 51 integral with a modified retaining disk 43'. The outer face of the housing 51 has a rectangular opening 52 designed to receive a locking bar head 53 of a rotating barrel 54 of a tumbler lock 55.

The housing 51 has a circular recess 56 larger than the head 53 to permit rotation of the head under two lips 57 which define the slot 52. The tumbler lock 55 has a body 59, the lower end of which has an integral positioning pin 60 extending therefrom. A key 61 in the rotating barrel 54 actuates the locking mechanism 50.

The tumbler lock 55 is removably mounted in the housing 51 to cover the housing opening 52. Operation of the cylinder lock key 61 permits removal of the lock to expose the opening 52 in the housing 51 and the opening 44 in the gear 35 for insertion of an operating key 63 into the gear. The operating key has a diametrically positioned pin 64 engageable with the gear slot 41. The body of the operating key 63 is round and when pushed into the opening 44 in the gear 35 moves the fingers 32 out of engagement with the slots 37 and 37' in the inner hub 36 of the gear 35. This permits the key 63 to rotate the gear 35 and the cam plate 22, to release the locking teeth 25 from the slots 14 in the studs 12. The large circular openings 24 come into axial alinement with the studs 12 and this permits removal of the wheel 15.

It is to be noted that the recessed disk 18 is fastened to the wheel 15 by bolts 65 passing through holes 66 in the wheel and through holes 67 in the said disk. Also, that screws 68 secure the retaining disk 43 to the disk 18.

As shown in Figure 2, I have provided leaf springs 70 extending laterally from the wheel 15 and secured by bolts 65. The springs 70 serve to snap into a hub cap which covers the studs 12 and protects the wheel locking assembly from the effects of rain and snow.

In accordance with the patent statutes I have described and illustrated the preferred embodiment of my invention, but it will be understood that various changes and modifications can be made therein without departing from the spirit of the invention as defined by the appended claims.

I claim:

1. A detachable wheel locking assembly comprising a hub having studs with tapering free end portions, said studs having radially directed slotted openings facing the axis of said wheel, said wheel having an annular recessed disk attached thereto and centrally thereof and having openings to receive said studs, said recessed disk having laterally extending annular guide walls at its inner and outer diameters providing an annular guideway between them, a disk-shaped cam plate rotatably mounted in said guideway and having modified key-hole shaped openings through the large portion of which said studs freely pass, the small portion of each of said openings having tapering inner walls designed to engage the slotted portion of said studs respectively in wedged engagement and being thereby adapted to withstand vibration, said cam plate having an opening and gear teeth positioned concentrically with the outer periphery of said disk, said recessed disk having a circular opening in alignment with said gear teeth opening in said cam plate, said recessed disk opening having two radially extending openings, two spring arms respectively having one end fixed to said recessed plate and extending into said radial openings and being movable laterally of said recessed disk at their adjacent free ends, a segmental gear having a hub with diametrically positioned slots, said gear hub being engageable in the circular opening of said recessed disk, the teeth of said segmental gear being in meshed engagement with the gear teeth in said cam plate, a retaining plate having a circular opening through which the outer hub portion of said gear freely passes, the teeth of said segmental gear being held between said recessed disk and said retaining disk, and a key having a circular portion engageable in said gear opening and having means engageable with said gear hub, said key being movable through said gear opening to move said spring arms out of engagement with said gear to permit rotation of said gear and said cam disk to a position when said modified key-hole cams are out of engagement with said studs, whereby said wheel is detachable from said hub.

2. In a detachable wheel locking assembly comprising a hub having studs with tapering free end portions, said studs having radially directed slotted openings facing the axis of said wheel, said wheel having an annular recessed disk attached thereto and centrally thereof and having openings to receive said studs, said recessed disk having an annular guideway, a disk-shaped cam plate rotatably mounted in said guideway and having modified key-hole shaped openings through the large portion of which said studs freely pass, the small portion of each of said openings having tapering inner walls designed to engage the slotted portion of said studs respectively in wedged engagement and being thereby adapted to withstand vibration, said cam plate having an arcuate opening and gear teeth positioned concentrically with the outer periphery of said disk, said recessed disk having a circular opening in alignment with said gear teeth opening in said cam plate, said recessed disk opening having two radially extending openings, two spring arms respectively having one end fixed to said recessed plate and extending into said radial openings and being movable laterally of said recessed disk at their adjacent free ends, a segmental gear having an inner hub with diametrically positioned slots, said gear hub being engageable in the circular opening of said recessed disk, the teeth of said segmental gear being in meshed engagement with the gear teeth in said cam plate, a retaining plate having a circular opening through which the outer hub portion of said gear freely passes, the teeth of said segmental gear being held between said recessed disk and said retaining disk, and a key having a circular portion engageable in said gear opening and having interlocking means engageable with the outer hub of said gear, said key being movable through said gear opening to move said spring arms out of engagement with said gear to permit rotation of said gear and said cam disk to a position when said modified key-hole cams are out of engagement with said studs, whereby said wheel is detachable from said hub.

3. In a detachable wheel locking assembly comprising a hub having studs with tapering free end portions, said studs having radially directed slotted openings facing the axis of said wheel, said wheel having an annular recessed disk attached thereto and centrally thereof and having openings to receive said studs, said recessed disk having an annular guideway, a disk-shaped cam plate rotatably mounted in said guideway and having modified key-hole shaped openings through the large portion of which said studs freely pass, the small portion of each of said openings having tapering inner walls designed to engage the slotted portion of said studs respectively in wedged engagement and being thereby adapted to withstand vibration, said cam plate having an arcuate opening and gear teeth positioned concentrically with the outer periphery of said disk, said recessed disk having a circular opening in alignment with said gear teeth opening in said cam plate, said recessed disk opening having two radially extending openings, two spring arms respectively having one end fixed to said recessed plate and extending into said radial openings and being movable laterally of said recessed disk at their adjacent free ends, a segmental gear having inner and outer hubs with an opening through both hubs, said inner hub having two diametrically positioned slots, said inner hub being engageable in the circular opening of said recessed disk, the teeth of said segmental gear being in meshed engagement with the gear teeth in said cam plate, a retaining plate having a circular opening through which the outer hub portion of said gear freely passes, the teeth of said segmental gear being held between said recessed disk and said retaining disk, and a key having a circular portion engageable in said gear opening and having diametrically positioned interlocking means engageable with the outer hub of said gear, said key being movable through said gear opening to permit rotation of said gear and said cam disk to a position when said modified key-hole cams are out of engagement with said studs, whereby said wheel is detachable from said hub.

4. In a detachable wheel locking assembly comprising a hub having studs with tapering free end portions, said studs having radially directed slotted openings facing the axis of said wheel, said wheel having an annular recessed disk attached thereto and centrally thereof and having openings to receive said studs, said recessed disk having an annular guideway, a disk-shaped cam plate rotatably mounted in said guideway and having modified keyhole shaped openings through the large portion of which said studs freely pass, the small portion of each said openings having tapering inner walls designed to engage the slotted portion of said studs respectively in wedged engagement and being thereby adapted to withstand vibration, said cam plate having an arcuate opening and gear teeth positioned concentrically with the outer perphery of said disk, said recessed disk having a circular opening in alignment with said gear teeth opening in said cam plate; said recessed disk opening having two radially extending openings, two spring arms respectively having one end fixed to said recessed plate and extending into said radial openings and being movable laterally of said recessed disk at their adjacent free ends, a segmental gear having inner and outer hubs with an opening through both hubs, said inner hub having two diametrically positioned slots, said inner hub being engageable in the circular opening of said recessed disk, the teeth of said segmental gear being in meshed engagement with the gear teeth in said cam plate, a retaining plate having a circular opening through which the outer hub portion of said gear freely passes, the teeth of said segmental gear being held between said recessed disk and said retaining disk, and an operating key having a circular portion engageable in said gear opening and having diametrically positioned interlocking means engageable with the outer hub of said gear, said operating key being movable through said gear opening to disengage said spring arms from said gear to permit rotation of said gear and said cam disk to a position when said modified key-hole cams are out of engagement with said studs, whereby said wheel is detachable from said hub.

5. In a detachable wheel locking assembly comprising a hub having studs with tapering free end portions, said studs having radially directed slotted openings facing the axis of said wheel, said wheel having an annular recessed disk attached thereto and centrally thereof and having openings to receive said studs, said recessed disk having an annular guideway, a disk-shaped cam plate rotatably mounted in said guideway and having modified keyhole shaped openings through the large portion of which said studs freely pass, the small portion of each of said openings having tapering inner walls designed to engage the slotted portion of said studs respectively in wedged engagement and being thereby adapted to withstand vibration, said cam plate having an arcuate opening and gear teeth positioned concentrically with the outer periphery of said disk, said recessed disk having a circular opening in alignment with said gear teeth opening in said cam plate, said recessed disk opening having two radially extending openings, two spring arms respectively having one end fixed to said recessed plate and extending into said radial openings and being movable laterally of said recessed disk at their adjacent free ends, a segmental gear having inner and outer hubs with an opening through both hubs, said inner hub having two diametrically positioned slots, said inner hub being engageable in the circular opening of said recessed disk, the teeth of said segmental gear being in meshed engagement with the gear teeth in said cam plate, a retaining plate having a circular opening through which the outer hub portion of said gear freely passes, the teeth of said segmental gear being held between said recessed disk and said retaining disk, said outer hub having a single diametrically positioned slot, said spring arms being engageable with one of said inner hub slots to lock said gear, to prevent rotation of said gear and said cam plate when said tapering walls in said cam plate are in wedged engagement with the slotted portions of said studs, thereby locking said wheel to said hub, said spring arms being also engageable with the other slot of said inner hub to lock said gear, to prevent rotation of said gear and said cam plate, when said tapering walls are out of engagement with the slotted portions of said studs, and an operating key having a portion engageable in said gear opening and having diametrically positioned interlocking means engageable with the slot in the outer hub of said gear, said operating key being movable through said gear opening to disengage said spring arms from said gear to permit rotation of said gear and said cam disk to a position when said tapering walls are out of engagement with said studs, whereby said wheel is detachable from said hub.

6. The invention as defined in claim 5, wherein an open ended hollow housing is provided concentric with said gear and a cylinder lock is removably mounted in said housing to cover the housing opening, and whereby operation of the cylinder lock key will permit removal of the cylinder lock to expose the opening to the gear for insertion of the operating key into the gear.

JOHN SCUDERI.

REFERENCES CITED

The following references are of record in the file of this patent:

UNITED STATES PATENTS

| Number | Name | Date |
|---|---|---|
| 1,353,511 | Baumgartl | Sept. 21, 1920 |
| 1,707,458 | Clench | Apr. 2, 1929 |
| 1,995,097 | Frye | Mar. 19, 1935 |
| 2,244,083 | Richter | June 3, 1941 |
| 2,246,710 | Babin | June 24, 1941 |